United States Patent [19]

Watanabe et al.

[11] Patent Number: 4,960,997
[45] Date of Patent: Oct. 2, 1990

[54] OPTICAL WINDOW AND RADIATION POSITION-SENSITIVE DETECTOR USING THE SAME

[75] Inventors: Mitsuo Watanabe; Toshihiko Sawai, all of Shizuoka, Japan

[73] Assignee: Hamamatsu Photonics Kabushiki Kaisha, Shizuoka, Japan

[21] Appl. No.: 299,161

[22] Filed: Jan. 18, 1989

[30] Foreign Application Priority Data

Jan. 19, 1988 [JP] Japan .................................. 63-9006

[51] Int. Cl.⁵ ........................... G01T 1/20; G02B 6/26
[52] U.S. Cl. .................................. 250/368; 250/487.1
[58] Field of Search ........................... 250/368, 487.1; 350/96.2

[56] References Cited

U.S. PATENT DOCUMENTS 3,870,399 3/1975 Randall et al. .................. 350/96 B
4,743,764 5/1988 Casey et al. ........................ 250/368
4,837,439 6/1989 Genna et al. ....................... 250/368

FOREIGN PATENT DOCUMENTS 1008025 10/1965 United Kingdom .

*Primary Examiner*—Janice A. Howell
*Assistant Examiner*—Richard Hanig
*Attorney, Agent, or Firm*—Finnegan, Henderson, Farabow, Garrett and Dunner

[57] ABSTRACT

An optical window comprises a plurality of glass members and a plurality of reflective members each being formed between the adjacent glass members. Each reflective member is made of a glass medium which is the same as the glass member and grain regions made of a material having large reflectance and interspersed in the glass medium. A radiation position-sensitive detector comprises a scintillator, the optical window of the invention, and a multi-anode type photomultiplier tube which has a plurality of photomultipliers.

9 Claims, 4 Drawing Sheets

OPTICAL WINDOW AND RADIATION POSITION-SENSITIVE DETECTOR USING THE SAME

BACKGROUND OF THE INVENTION

The present invention relates to an optical window suitable for use in radiation position-sensitive detectors and other devices.

Optical windows are known that are to be coupled to a scintillator and a photomultiplier tube for use in such devices as a radiation position-sensitive detector.

FIG. 7 is a plan view of an optical fiber plate window which is commonly known as a typical example of such optical windows. The window generally indicated as 50 is formed of a lattice pattern of optical fibers each having a coaxial structure of core glass 51 and clad glass 52. The core glass 51 has a greater refractive index than the clad glass 52. The optical fiber plate window 50 accepts only light that is incident at angles within the range of its "numerical aperture" and allows total reflection of light at the boundary between the core glass 51 and the clad glass 52 so that the light will propagate through the fiber guide without reflection loss.

In the optical fiber plate window 50 shown in FIG. 7, the core glass 51 and the clad glass 52 have to be formed of dissimilar materials having different refractive indices, so it is difficult to eliminate the thermal expansion mismatch between the two members. One of the problems associated with this difficulty has been the high probability that cracking will occur due to a temperature change or other factors during the fabrication or practical use of the optical window 50.

In addition, because of the circular cross section of individual optical fibers, a gap 53 forms between adjacent fibers and light entering this gap will be directly transmitted through it, producing spatial divergence of light to become a potential cause of crosstalk. An absorber may be provided in the gap 53 in order to prevent the occurrence of such crosstalk, but then the light entering the gap 53 will be lost through absorption by the absorber.

As already mentioned, the optical fiber plate window 50 has its own numerical aperture, which may be increased when light is to be accepted from the aerial layer. However, when the window 50 is to be coupled with a scintillator or the like in practical applications, an optical coupler is customarily inserted between the scintillator and the window 50 so as to prevent reflection loss at the boundary between these two members. In the presence of the optical coupler, there occurs a corresponding decrease in the numerical aperture of the window to cause increased loss of light in it.

SUMMARY OF THE INVENTION

An object, therefore, of the present invention is to provide an optical window that is capable of reducing the probability that cracking will occur during manufacture or use of the window.

Another object of the present invention is to provide an optical window with a novel structure that is capable of enhancing position resolution without sacrificing energy resolution.

An optical window according to the present invention comprises: a plurality of glass members; a plurality of reflective members each being formed between the adjacent glass members, said reflective member being made of a glass medium which is the same as the glass member and grain regions made of a material different from the glass medium and interspersed in the glass medium.

In the optical window of the present invention, the reflective member is formed between the adjacent glass members so that light incident upon a certain glass member will be reflected at the boundary between this glass member and the adjacent reflective member. Since the reflective members are formed of a glass medium that is the same as the glass members, the thermal expansion mismatch between the glass members and reflective members can be so reduced as to lower the probability that cracking will occur during manufacture or use of the optical window. As a further advantage, since the optical window of the present invention can be manufactured without forming any gaps in it and the reflective members are made of a glass medium that is interspersed with grain regions, the probability that incident light is transmitted through the reflective member to enter the adjacent glass member or that it is absorbed by the reflective member can be reduced without causing any problems associated with the numerical aperture of the optical window. Therefore, when this optical window is used in combination with a radiation position-sensitive detector, position resolution can be enhanced without sacrificing energy resolution.

A radiation position-sensitive detector according to the invention comprises: a scintillator for detecting a radiation; the optical window according to the invention for receiving first light emitted from the scintillator with one of the plurality of glass members and outputting second light from the same glass member; a multianode type photomultiplier tube having a plurality of photomultipliers for detecting the second light.

Other and further objects, features and advantages of the invention will appear more fully from the following description taken in connection with the accompanying drawings.

DETAILED DESCRIPTION OF THE PREFERRED EMBODIMENTS

Several embodiments of the present invention are described hereinafter with reference to the accompanying drawings.

Figure 1:
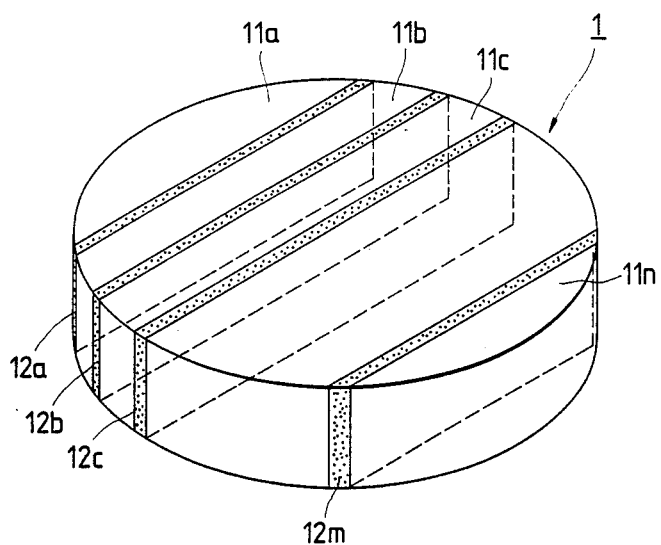
FIGS. 1 and 2 are a perspective and a cross-sectional view of an optical window according to an embodiment of the present invention, respectively.
Figure 2:
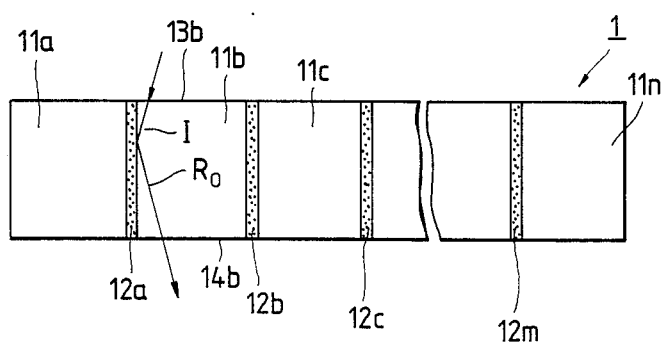

FIGS. 1 and 2 are a perspective and a cross-sectional view of an optical window according to one embodiment of the present invention.

As shown, the optical window 1 comprises a plurality of glass members 11a–11n between which are formed reflective members 12a–12m (m=n−1). The glass members 11a–11n may be formed of Borosilicate glass, whereas the reflective members 12a–12m are formed of a glass medium that is the same as the glass members 11a–11n and is interspersed with grain regions made of a material different from the glass medium. The each grain region is filled with particles such as White Alundum (trade name).

Borosilicate-glass consists of 67% $SiO_2$, 2.0% $Al_2O_3$, 6.5% $Na_2O$, 6.5% $K_2O$ and 22% $B_2O_3$ and has a thermal expansion coefficient of $46 \times 10^{-7}/°C$.

White Alundum is made of $Al_2O_3$ and its thermal expansion coefficient which varies somewhat with the cutting direction is in the range of $45 \times 10^{-7}$ to $53 \times 10^{-7}/°C$. in the case of single-crystal sapphire, that is, about the same as that of Borosilicate glass.

The reflective members 12a-12m are typically arranged at spacings of several millimeters, which may of course be adjusted to a greater or smaller value.

Figure 3A:
FIGS. 3(a) to 3(c) show the sequence of steps in the process of fabricating the optical window shown in FIGS. 1 and 2.

The process of fabricating the optical window 1 is described hereinafter in greater detail. In the first step, a reflective member 12a is coated on a glass member 11a as shown in FIG. 3(a). At this stage, the reflective member 12a is in the form of a paste that has been prepared by first mixing glass particles and White Alundum in predetermined proportions, adding to the mixture Veecle (trade name) having an acrylic resin dissolved in α-terpineol at a concentration of 5%, then kneading the mixture thoroughly. Veecle is to be finally removed from the reflective member 12a by firing as will be described below.

Figure 3B:
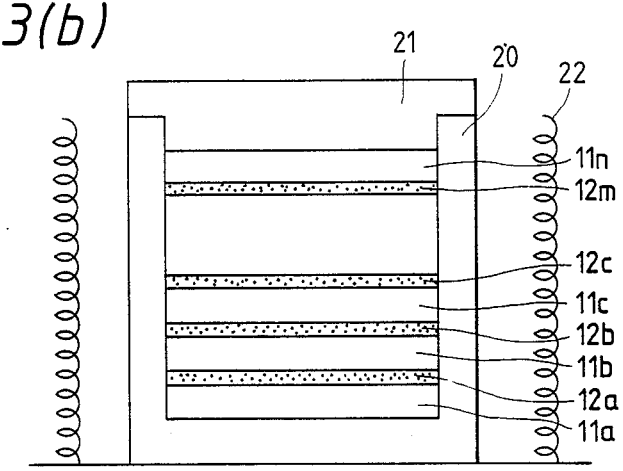
Figure 3C:
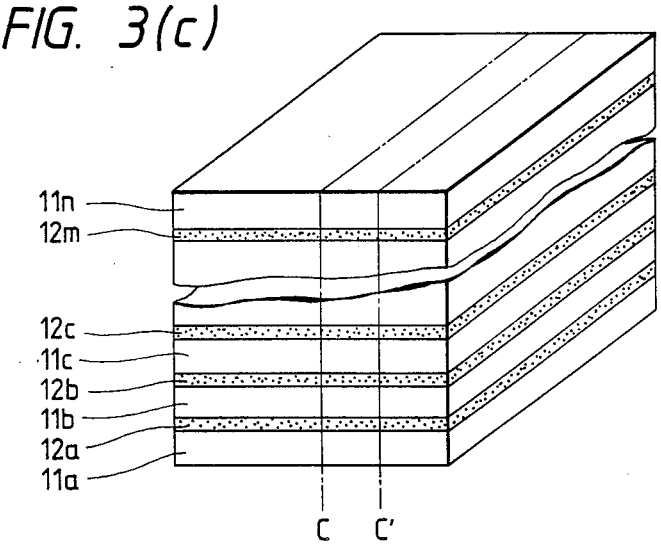

In the next step, the glass member 11a having the coating of reflective member 12a in paste form is dried at 120° C. for 10 to 20 minutes and thereafter calcined by holding in either air or oxygen at 380° C. for ca. 10 minutes, whereupon the resin (binder) is removed from the reflective member 12a. In a like manner, reflective members 12b, 12c . . . 12m are coated on glass members 11b, 11c . . . 11m, dried and calcined. Subsequently, the glass members 11a-11n are stacked in a furnace 20 as shown in FIG. 3(b) and fired with a heater 22 at ca. 500° to 800° C. for ca. 30 minutes to 1 hour, with a pressure of ca. 10 to 50 kg/cm² being applied by means of a plunger 21. The stack is then cooled to form an assembly in which the reflective members 12a-12m are firmly secured between glass members 11a-11n. The assembly is sliced with a cutter along lines C and C' and worked up into an optical window 1 as shown in FIGS. 1 and 2 by grinding and polishing to a cylindrical shape. The optical window 1 shown in FIGS. 1 and 2 has a stripe pattern, but the reflective members may be formed in a lattice pattern. The optical window may adopt various other patterns depending upon its specific use.

The gaps 53 present in the conventional optical fiber plate window 50 are absent from the optical window 1 of the present invention, so the latter is free from the problem of spatial divergence of light (i.e. crosstalk) or light loss due to such gaps. In this optical window 1, the reflective members 12a-12m are composed of a glass medium that is interspersed with grain regions made of a material different from the glass medium. Therefore, even if incident light I that falls on the entrance surface 13b of a glass member 11b reaches a certain reflective member, say, 12a as shown in FIG. 2, the probability that incident light I will be transmitted through the member 12a to enter an adjacent glass member 11a is small. In addition, the reflective members 12a-12m have low light absorbance, so the probability that incident light I traveling through the glass member 11b will be absorbed by a reflective member, say 12a, is also small.

As described above, the optical window 1 according to one embodiment of the present invention is free from all of the problems that would otherwise result from gaps. Furthermore, by virtue of the characteristics of the reflective members 12a-12m, the spatial divergence of light and loss of light can be suppressed without causing the numerical aperture problem that has been encountered in the prior art optical fiber plate window 50.

Position resolution $R_p$ in the position calculation by centroid method is generally expressed by the following relationship:

$$R_p \propto \sigma/\sqrt{N} \tag{1}$$

where N is the quantity of light issuing from the exit surface of a given glass member, and $\sigma$ is the spatial spread of output light from the optical window. As this relationship shows, the spatial resolution $R_p$ becomes smaller (i.e. is improved) as N (the quantity of light emanating from the exit surface of a given glass member) increases or $\sigma$ (the spatial spread of output light) decreases. With the optical window 1 under discussion, the spatial spread $\sigma$ can be reduced without decreasing N, so the position resolution $R_p$ can be increased to a higher value.

Energy resolution, or sensitivity of position detection, $R_E$ is expressed by the following relationship:

$$R_E \propto 1/\sqrt{N} \tag{2}$$

As one can see from this expression, the optical window 1 of the present invention which is capable of avoiding the decrease in N also has the ability to enhance the energy resolution $R_E$.

Figure 7:
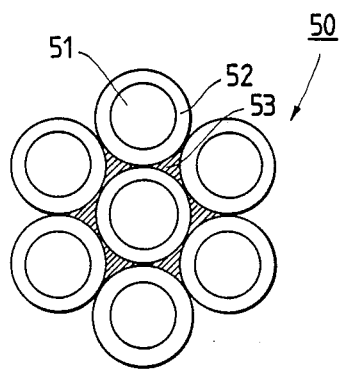
FIG. 7 is a plan view of a conventional optical fiber plate window.

In the optical window 1, the reflective members 12a-12m are formed of a glass medium that is the same as the glass members 11a-11n, thereby reducing the thermal expansion mismatch between the reflective members 12a 12m and the glass members 11a-11n. This offers the advantage of reducing the probability of the occurrence of cracking in the optical window due to a temperature change or other factors during its manufacture or practical use as compared with the optical window 50 shown in FIG. 7.

The ratio of glass particles to White Alundum, which are the components of the reflective members 12a-12m in the optical window 1 under consideration is freely adjustable and may be selected at 2:1 on a weight basis. If the amount of glass particles is increased beyond 2:1 so that the thermal expansion coefficient of the reflective members 12a-12m is made substantially equal to that of the glass members 11a-11n, the probability of the occurrence of cracking in the optical window 1 can be further reduced. If White Alundum is not used at all, a glass material will result that is interspersed with bubbles, say air bubbles, in the areas which should be "grain regions" in the reflective members 12a-12m. If the proportion of White Alundum is increased from the 2:1 ratio, the reflectance of light by the reflective members 12a-12m can be further increased to achieve a better position resolution. Even if the content of White Alundum is increased, since its thermal expansion coefficient is about the same as that of the glass particles (already described above), the thermal expansion coefficient of the reflective members can be made substantially equal to that of the glass members, thereby reducing the probability of cracking in the optical window. For these reasons, the optical window 1 under consideration is entirely novel in that not only is it possible to reduce the probability of cracking in this window but also both the position resolution and energy resolution can be improved.

In the embodiment described above, glass particles are mixed with White Alundum to form the reflective members 12a-12m. It should, however, be noted that White Alundum may be replaced by any other materials having high light reflectance such as barium sulfate and fine metal (Ag) particles. In the course of development of the present invention, it was proposed that reflective members be formed as colored glass by interspesing iron oxide or some other suitable material in a glass medium which is the same as the glass members. The colored glass was effective in reducing the probability of cracking but as it turned out, light was absorbed by the colored glass and the quantity of light N issuing from the exit surface of a given glass member was insufficient to achieve significant improvement in position resolution or energy resolution.

Figure 4:
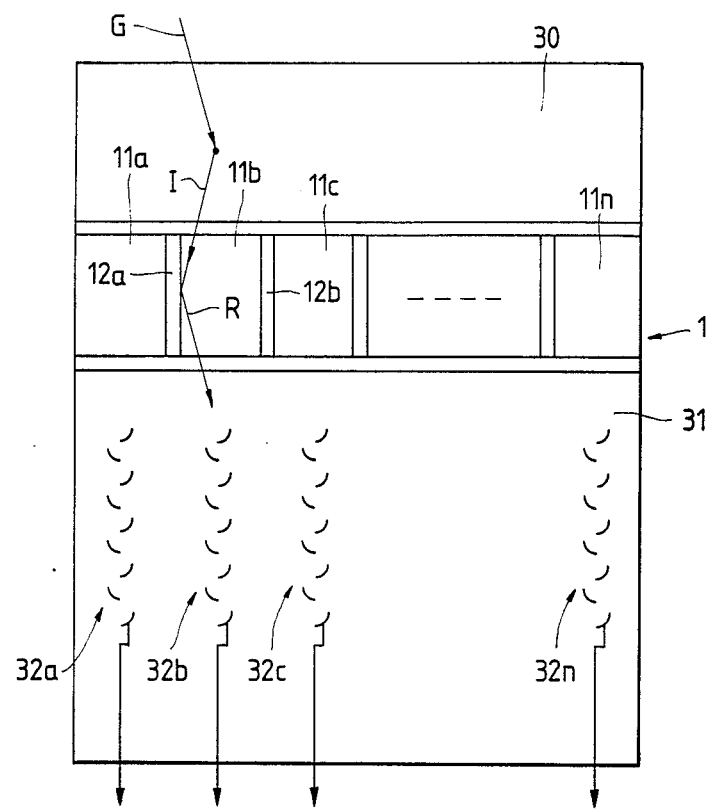
FIG. 4 to FIG. 6 show various embodiments in which the optical window of the invention is used in a radiation position-sensitive detector.

FIG. 4 shows schematically an embodiment in which the optical window 1 described above is used in a radiation position-sensitive detector. As shown, the optical window 1 is placed in intimate contact with both a scintillator 30 which emits light upon reception of a radiation and a multi-anode type photomultiplier tube 31. If the scintillator 30 is formed of a deliquescent material such as NaI, the optical window 1 will also perform the function of a protective film that prevents deliquescence of the scintillator 30. Glass members 11a-11n in the optical window 1 are formed in a stripe or lattice pattern at such spacings as will correspond individually to the dynodes and anodes 32a-32n in the multi-anode type photomultiplier tube 31.

With reference to FIG. 4, if a radiation G falls on the scintillator 30, light is emitted and enters a certain glass member, say 11b, in the optical window 1, that is close to the position where radiation G has entered. The incident light I travels through the glass member 11b. If it strikes reflective members 12a and 12b, it is reflected therefrom and enters as reflected light R the multi-anode type photomultiplier tube 31. The light R undergoes photoelectric conversion on a photocathode (not shown) and emitted photoelectrons are supplied to dynodes and an anode 32b that correspond to the glass member 11b.

In accordance with the present invention, even if the incident light I strikes the reflective members 12a and 12b, the latter will hardly transmit or absorb it, so that the probability that the light will enter an adjacent glass member 11a or 11c to be finally supplied to unwanted dynodes and an anode 32a or 32c or that the light will be absorbed by the reflective members 12a and 12b is greatly reduced.

In other words, the light entering the glass member 11b in the optical window 1 will be supplied to the corresponding dynodes and anode 32b with high probability while experiencing only a small amount of loss in light quantity. As a result, the incident position of the radiation can be detected with high sensitivity and with good position resolution.

Figure 5:
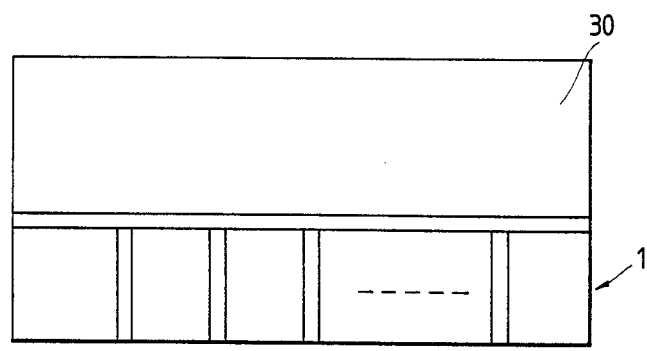
Figure 6:
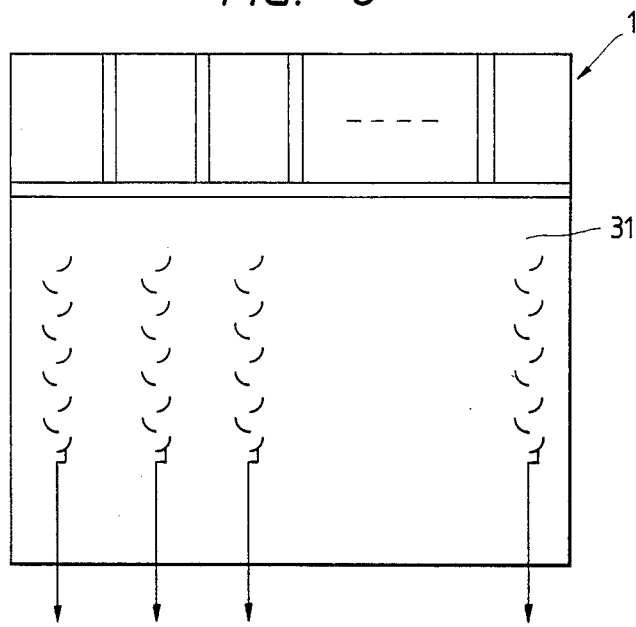

In the embodiment shown in FIG. 4, the optical window 1 is placed in intimate contact with both the scintillator 30 and the multi-anode type photomultiplier tube 31. Alternatively, the optical window 1 may be placed in intimate contact with the scintillator 30 alone as shown in FIG. 5. If the scintillator 30 is not formed of a deliquescent material, it may be placed in intimate contact with the multi-anode type photomultiplier tube 31 alone as shown in FIG. 6.

Although in the above embodiment of the radiation position-sensitive detector the glass members 11a-11n are in one-to-one correspondence with the photomultipliers 32a-32n, the present invention is not limited to this embodiment. That is, the radiation incidence position can be determined by centroid calculation method even in the case that the glass members do not individually correspond to the photomultipliers, because the output light from the optical window somewhat spreads.

As described on the foregoing pages, the reflective members in the optical window of the present invention are formed of a glass medium that is the same as the glass members and the grain regions which are made of a material different from the glass medium and interspersed therein. Therefore, if this optical window is applied to the radiation position-sensitive detector for the purpose of sensing the incident position and energy of the radiation, the position resolution can be improved without sacrificing the energy resolution and at the same time, the probability that cracking will occur in the window during its manufacture or use can be significantly reduced.

What is claimed is:

1. An optical window, comprising:
   a plurality of glass members; and
   a plurality of reflective members each being formed between adjacent ones of said glass members, each of said reflective members comprising:
   a glass medium which is the same as said glass member; and
   grain regions made of a material different from said glass medium and interspersed in said glass medium.

2. An optical window as claimed in claim 1, wherein said plurality of reflective members are of striped shape.

3. An optical window as claimed in claim 1, wherein said plurality of reflective members are of lattice shape.

4. An optical window as claimed in claim 1, wherein said plurality of glass members are made of Borosilicate glass.

5. An optical window as claimed in claim 1, wherein each of said grain regions is filled with particles which have large reflectance.

6. An optical window as claimed in claim 5, wherein said particles are made of $Al_2O_3$.

7. A radiation position-sensitive detector, comprising:
   a scintillator for emitting first light in response to absorption of an incident radiation;
   an optical window for receiving said first light with one of a plurality of glass members and outputting second light from the same glass member, said optical member comprising:
   said plurality of glass members; and
   a plurality of reflective members each being formed between adjacent ones of said glass members, each of said reflective members comprising: a glass medium which is the same as said glass member; and grain regions made of a material different from said glass medium and interspersed in said glass medium; and
   a multi-anode type photomultiplier tube having a plurality of photomultipliers for detecting said second light.

8. A radiation position-sensitive detector as claimed in claim 7, wherein said plurality of photomultipliers are in one-to-one correspondence with said plurality of glass members in said optical window.

9. A radiation position-sensitive detector as claimed in claim 7, wherein said optical window is in intimate contact with at least one of said scintillator and said multi-anode type photomultiplier tube.

* * * * *